(12) United States Patent
Wang

(10) Patent No.: US 6,683,893 B2
(45) Date of Patent: Jan. 27, 2004

(54) Q-SWITCHING METHOD FOR PULSE TRAIN GENERATION

(75) Inventor: Charles X. Wang, Santa Clara, CA (US)

(73) Assignee: Coherent, Inc., Santa Clara, CA (US)

( * ) Notice: Subject to any disclaimer, the term of this patent is extended or adjusted under 35 U.S.C. 154(b) by 223 days.

(21) Appl. No.: 10/001,681

(22) Filed: Oct. 25, 2001

(65) Prior Publication Data

US 2003/0081636 A1 May 1, 2003

(51) Int. Cl.[7] .................................................. H01S 3/11
(52) U.S. Cl. ........................................... 372/10; 372/25
(58) Field of Search ............................. 372/10, 25, 17, 372/18

(56) References Cited

U.S. PATENT DOCUMENTS

| | | | | |
|---|---|---|---|---|
| 5,007,039 A | * | 4/1991 | Sakemoto et al. | 369/116 |
| 5,022,033 A | * | 6/1991 | Hackell | 372/25 |
| 5,173,917 A | * | 12/1992 | Palma et al. | 372/94 |
| 5,197,074 A | * | 3/1993 | Emmons et al. | 372/26 |
| 5,912,912 A | | 6/1999 | Caprara et al. | 372/25 |
| 6,038,241 A | | 3/2000 | von Elm et al. | 372/30 |
| 6,414,980 B1 | * | 7/2002 | Wang et al. | 372/92 |
| 2002/0141457 A1 | * | 10/2002 | Adams | 372/10 |

FOREIGN PATENT DOCUMENTS

| | | | | |
|---|---|---|---|---|
| WO | WO 01/28050 | 4/2001 | | H01S/3/11 |

* cited by examiner

*Primary Examiner*—Paul Ip
*Assistant Examiner*—Phillip Nguyen
(74) *Attorney, Agent, or Firm*—Stallman & Pollock LLP

(57) ABSTRACT

A method of operating a continuously pumped, Q-switched laser to provide trains of pulses for laser operations is disclosed. The laser includes a solid-state gain-medium that exhibits a thermal-lensing effect on being optically pumped. Pulse delivery is controlled by a Q-switch that is in a normally-open state when the laser is not delivering pulses. This allows the laser to deliver CW laser radiation when pulses are not being delivered. A train of pulses is delivered by repeatedly interrupting the CW operation by closing then reopening the Q-switch. When the Q-switch reopens after the interruption, the laser delivers a pulse of laser radiation, then resumes delivery of CW operation until the next interruption. The inventive Q-switching method provides, by means of this one particular repeated Q-switch operation, that the thermal-lensing effect in the gain-medium before, during, and between delivery of pulse trains remains constant, and that all pulses in a pulse train have the same peak power.

6 Claims, 2 Drawing Sheets

Q-SWITCHING METHOD FOR PULSE TRAIN GENERATION

TECHNICAL FIELD OF THE INVENTION

The present invention relates generally to generating laser pulse trains in a continuously pumped, solid-state laser. The invention relates in particular to a method of generating a pulse train in a continuously pumped, solid-state laser by repeatedly interrupting CW operation of the laser using a Q-switch.

DISCUSSION OF BACKGROUND ART

Pulsed lasers are used widely in applications such as microvia drilling, materials marking, stereo lithography, and biosciences. In many of these applications, both precision and flexibility of operation are important. Precision requires that the laser have consistent and essentially identical beam propagation properties and the same laser pulse energy from pulse to pulse. Flexibility includes being able to provide complex pulse trains with variable time periods therebetween. The time period between pulses can range from a tens of microseconds ($\mu s$) to a second or greater.

An optimum combination of precision and flexibility includes the capability to deliver laser pulses in a preferred timing sequence with constant or variable (yet consistent) laser pulse energy and nearly identical beam propagation properties. Consistent beam propagation properties are required so that the laser pulses can be consistently focused into a desired spot size at a predetermined location.

Continuously pumped, repetitively Q-switched, solid-state lasers (diode-laser-pumped lasers, in particular) are preferred pulsed laser sources for above-mentioned applications. This is because such lasers have high efficiency, long lifetime, and high reliability. In such a solid-state laser, thermal effects in the laser gain-medium due to optical pumping require particular attention in designing the laser. Significant thermal effects include thermal-lensing and thermal-birefringence, resulting, respectively, from thermal gradient and thermal stress. It is possible to configure a resonator for such a solid-state laser to compensate for or accommodate a predetermined range of thermal effects and minimize variation of laser properties due to changes in these thermal effects within that predetermined range. This can be done in a fixed laser resonator by suitable selection of resonator parameters. It is also possible to have a resonator that is dynamically reconfigurable to accommodate for measured or predicted thermal-lensing changes. Even in such a compensated resonator, if there is a significant difference in thermal-lensing conditions in a gain-medium during and between delivery of pulse trains, the pulses in a train can vary in amplitude and beam propagation properties in a manner that depends on the timing sequence of the laser pulses. Compensation can be insufficient (in the case of a fixed resonator) or too slow (in the case of a dynamically compensated resonator).

In prior-art continuously pumped, repetitively Q-switched solid-state lasers, the Q-switch remains closed between delivery of laser pulses. The term closed, here, means that the Q-switch causes high loss in the resonator so that lasing is prohibited. In such a prior art laser, thermal load on the gain-medium varies with pulse repetition frequency (PRF). Consequently the above-discussed thermal effects, among which thermal lensing usually plays a prominent role in affecting the laser spatial mode and stability, will also vary.

Thermal lensing occurs due to a spatial variation in refractive index of the solid-state gain-medium resulting from a thermal gradient in the gain-medium. This thermal gradient results from heating of the gain-medium by a portion of pump power absorbed therein that is not extracted as laser radiation and other factors. In an end-pumped gain-medium, thermal lensing is proportional to the difference between the total pump power and the power extracted from the gain-medium as laser radiation. The power extracted from the gain-medium depends in turn on the PRF.

By way of example, in a prior-art continuously pumped, repetitively Q-switched solid-state laser, using $Nd:YVO_4$ as the gain-medium, end-pumped with 27 W of diode power, the average laser power extracted from the gain-medium may be about 12.6 W at 50 KHz and 4.6 W at 5 KHz, respectively. Accordingly, net heating power and therefore thermal-lensing will be proportional to 14.4 W and 22.4 W at 50 KHz and 5 KHz PRF. It can be seen that significant thermal lensing variation can occur and can result in significant change in laser spatial mode if the laser is switched between the two different PRFs. This can result in a problem in providing precise machining or marking for example. The problem is exacerbated if pulses of fundamental radiation from the resonator are frequency converted, for example, to generate second, third, or fourth harmonic wavelengths, in one or more optically-nonlinear crystals before being used in a particular application. This is because such frequency conversion always amplifies any variation in the fundamental beam. Accordingly, there is a need for a method to overcome variations of the thermal effects in the gain-medium when the laser is switched between significantly different PRFs.

In PCT Application WO 01/28050, published Apr. 19, 2001, and assigned to the assignee of the present invention, a method of operating a pulsed laser is described in which the gain-medium is continuously-pumped at a constant level and the laser is operated, between delivery of trains of pulses having sufficient energy to perform a machining operation or other application, to provide "thermal-lensing-control" pulses having insufficient energy to perform the machining operation or application. The rate at which the thermal-lensing-control pulses are delivered is higher than the rate at which the trains of machining pulses are delivered, and is adjusted such that the average laser power extracted from the continuously-pumped gain-medium is about the same as that extracted during delivery of the machining pulses. In one arrangement, the laser is operated in a continuous-wave (CW) mode between delivery of machining pulses with the CW power being about the same as the average power during delivery of the machining pulses. By extracting about the same amount of average laser power from the gain-medium between and during periods in which machining pulses are delivered thermal lensing in the gain-medium can be maintained in the range for which the laser resonator is compensated. While the method is generally effective it is not always possible to eliminate thermal-lensing changes effectively in the transition to delivery of machining pulses from delivery of non-machining pulses (or CW laser beam). This is particularly true when machining pulses are delivered at relatively slow rate for the delivery period, for example less than 10 KHz, and between machining-pulse delivery periods the laser is operated at high PRF or CW. This is because the average power extraction from the gain-medium for the two sequences is significantly different and accordingly the thermal lensing change will result in variation in laser pulse energy or laser beam propagation properties for the pulses delivered. Operation of the laser is further complicated by the fact that, even when it is possible to equate thermal lensing between and during machining-pulse delivery periods, it is necessary to allow a particular delay between the delivery of thermal-lensing-control pulses (or CW laser beam) and delivery of machining pulses. This delay provides that the energy stored in the gain-medium at the instant of delivering the first machining pulse in a train is the same as it will be at the instant of delivering every other pulse in the train. There is a need for a less complicated method of operating a solid-state laser to deliver trains of machining pulses.

SUMMARY OF THE INVENTION

The present invention is directed to a method delivering a sequence of pulses of laser radiation from a laser having a resonator including a solid-state gain-medium. In one aspect, the method comprises continuously optically pumping the solid-state gain-medium such that laser radiation can be generated in the resonator. The laser is operated such that laser radiation is generated in a continuous-wave (CW) mode. Then, the CW operation is repeatedly interrupted for a period sufficient that at the end of the interruption period the laser delivers a pulse of laser radiation before resuming the continuous-wave operation. This causes the laser to deliver the sequence of pulses of laser radiation, with the time period between sequential pulses being the time period between repeated interruption periods. The laser operates in a continuous-wave mode between deliveries of sequential pulses.

In another aspect of the present invention, the interruption period and the time period between sequential pulses are selected such that the average radiation power delivered in interrupted and uninterrupted CW operation is about the same. If the continuous pumping power is held constant, this causes thermal-lensing effects in the solid-state gain-medium to remain constant during and between deliveries of sequences of pulses. If the resonator is compensated for that constant level of thermal lensing, each pulse in a sequence will have about the same pulse energy and beam propagation property. Preferably, the ratio of the time period between sequential pulses to the interruption period is about 3:1 or greater. The method is particularly suited for delivering pulses sequences at a pulse-repetition rate of about 200 KHz or less.

In yet another aspect of the present invention, the resonator includes a Q-switch arranged to allow the continuous-wave operation when open, and the Q-switch is closed during the interruption period. In prior-art, continuously pumped, Q-switched pulsed lasers, the Q-switch is normally closed to prevent generation of laser radiation and is opened to initiate delivery of a pulse and closed immediately thereafter.

In still another aspect of the present invention, the optical pumping and the interruption period are arranged such that the pulses have a peak power sufficient to perform a predetermined laser operation and the laser radiation delivered in CW mode has insufficient power to perform the operation. If the pulse sequence is passed through an optically-nonlinear crystal to generate frequency-converted radiation or frequency harmonics, such as frequency-doubled radiation or second harmonic radiation, the peak power of the frequency-doubled pulses can be more than ten-thousand times the peak power of the frequency converted CW radiation for same frequency-conversion arrangement.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
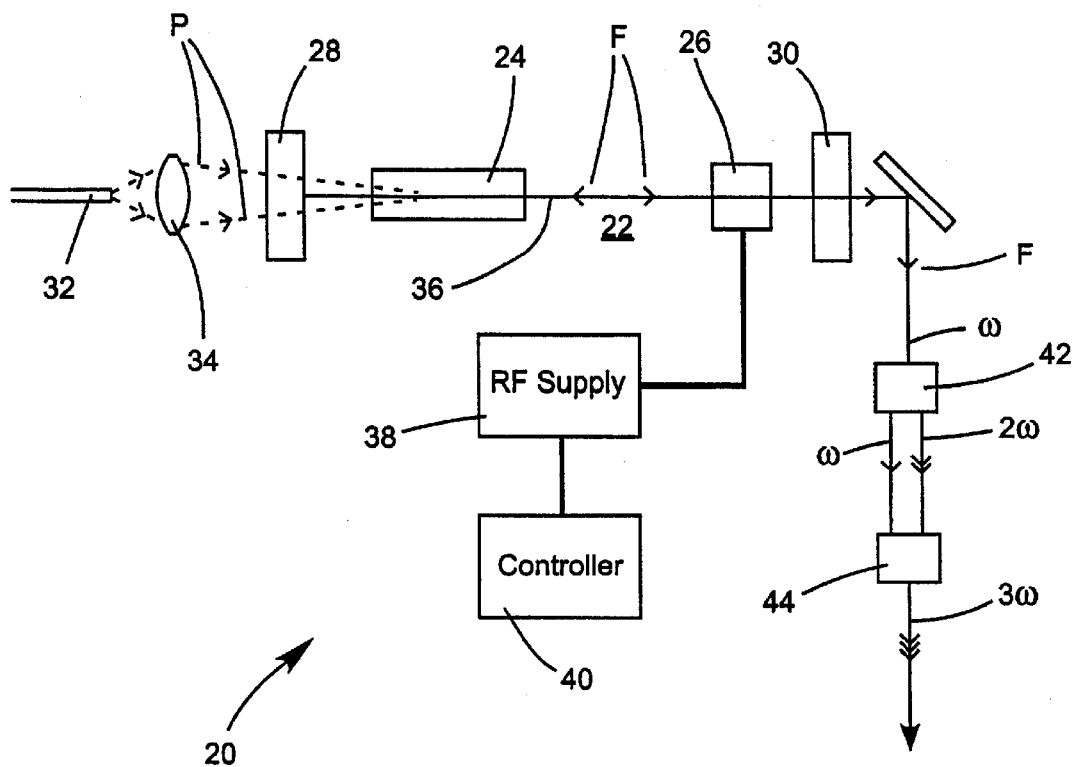
FIG. 1 schematically illustrates a prior-art, optically pumped, solid-state laser having a resonator including a Q-switch and a controller for opening and closing the Q-switch.

Referring now to the drawings, wherein like features are identified by like reference numerals, FIG. 1 schematically illustrates a basic, prior-art solid-state laser 20 having a laser resonator 22 including a solid-state gain-medium 24 and a Q-switch 26. Resonator 22 is formed between mirrors 28 and 30. Gain-medium 24 is continuously optically end-pumped by pump-light P delivered thereto via an optical fiber 32 and a lens 34 from a source such as a diode-laser or a diode-laser array. Fundamental laser radiation generated in the resonator in response to the optical pumping circulates along a longitudinal axis 36 of resonator 22, as indicated by single arrows F. Mirror 30 is made partially transmitting for the wavelength of the fundamental radiation to allow delivery of the radiation from the resonator.

If gain-medium 24 exhibits a significant thermal-lensing effect, resonator 22 is arranged to compensate for a range of such thermal lensing by selecting appropriate resonator parameters, including mirror curvature, resonator length and axial location of the gain-medium in the resonator. For a fixed pump configuration and resonator, the thermal lensing in any gain-medium is determined, inter alia, by the difference between the power of pump-light absorbed in the gain-medium and the power of laser radiation extracted from the gain-medium as laser radiation, as discussed above.

Laser radiation can only circulate in resonator 22 when Q-switch 26 is in an "open" condition. In the open condition the Q-switch does not cause sufficient loss of fundamental radiation to prevent generation of the laser radiation. A preferred Q-switch is an acousto-optic Q-switch. Such a Q-switch is "closed" by applying an RF potential thereto from an RF supply or driver 38. Application of the RF potential causes Q-switch 26 to deflect a proportion of fundamental radiation incident thereon along axis 36 to be deflected out of resonator 22. If the deflected proportion is sufficiently high, the resulting loss is so high that laser radiation can not be generated in the resonator. Application of the RF potential is controlled by a controller 40. The manner in which the Q-switch is opened and closed according to instructions from controller 40 determines the mode in which laser radiation is delivered from the laser resonator in response to the continuous optical pumping.

Fundamental radiation F is delivered from resonator 22 via mirror 30 as noted above. The radiation can be used directly, or may be passed through one or more optically-nonlinear crystals to convert the fundamental wavelength to shorter wavelengths. In laser 20, fundamental radiation F having a frequency ω is passed through a first optically-nonlinear crystal 42. Crystal 42 converts a portion of the fundamental radiation to second-harmonic radiation having a frequency 2 ω (designated by double arrows in FIG. 1). The second-harmonic and fundamental radiation are then mixed in a second optically-nonlinear crystal 44 to provide third-harmonic radiation having a frequency 3 ω (designated by triple arrows in FIG. 1). Those skilled in the art will recognize without further illustration that fourth harmonic radiation can be generated by passing the second-harmonic radiation only through the second optically-nonlinear crystal.

It should be noted that laser 20 exemplifies only a basic laser resonator, and is discussed here for the purpose of identifying basic resonator components and parameters that are discussed herein below in describing the inventive method of operating a continuously-pumped solid-state laser to deliver a train of pulses therefrom. A more complex continuously pumped laser, including two separately pumped gain-elements and means for adjusting length of the resonator to compensate for different ranges of thermal lensing, is described in detail in U.S. Pat. No. 5,912,912 (Caprara et al), the complete disclosure of which is hereby incorporated by reference. The inventive method is equally applicable in this laser and other continuously pumped, Q-switched, solid-state lasers.

Figure 2A:
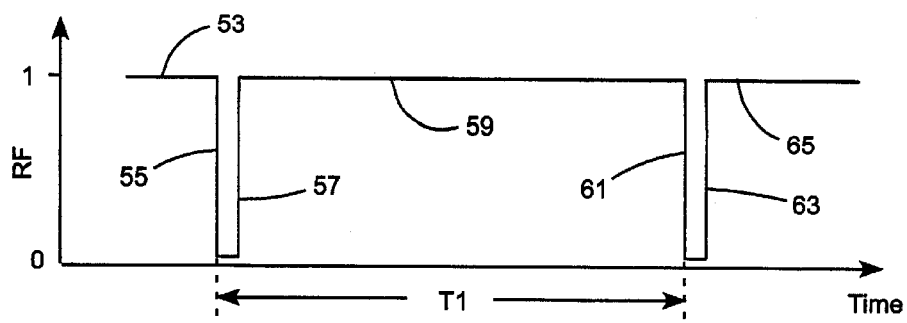
FIGS. 2A and 2B are timing diagrams schematically illustrating a prior-art method for operating the Q-switch of FIG. 1 to cause the laser to deliver a sequence of pulses.
Figure 2B:
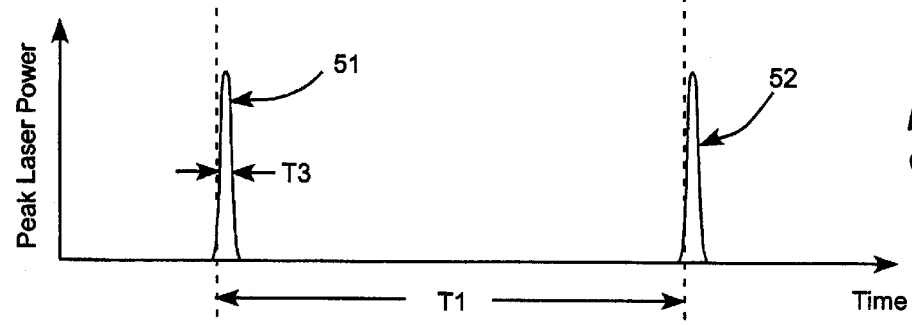

A common prior-art method of operating Q-switch 26 to deliver a sequence or train of pulses from laser 20 for performing a machining or ablating operation is schematically illustrated by timing-diagrams in FIGS. 2A and 2B. FIG. 2B depicts first and second sequential pulses 51 and 52 in a train or sequence of such pulses that may number in tens or hundreds, depending on the particular application of the pulses. FIG. 2A depicts the Q-switch operation that provides the pulse. The RF level required to close the Q-switch is designated 1, with a level 0 indicating that the Q-switch is open. The Q-switch is maintained in a "normally-closed" condition (line 53). The Q-switch is then opened as indicated (line 55) allowing the delivery of pulse 51. Pulse 51 occurs as a result of energy being stored in the gain-medium because of continuous pumping without extraction of laser radiation. The switching time for opening the Q-switch, i.e., the time taken to transition from 0 to 1 in FIG. 2A, depends on the capability of the RF driver 38, and is on the order of 10 nanoseconds (ns) for a typical 80 MHz RF driver. The laser pulse-width T3 is in a range from a few nanosecond to hundreds of nanoseconds, depending on the resonator configuration, the gain-medium, pump power and pump configuration. The Q-switch is then closed (line 57) to prevent further delivery of laser radiation, thereby returning the Q-switch to the normally-closed condition after the pulse is delivered (line 59). The Q-switch is usually closed in about 2 microseconds ($\mu$s) after it is opened. The closing switching time (the time from 1 to 0 in FIG. 2A) is typically on the order of 100 ns. The Q-switch is then opened again (line 61), after a time T1 following the previous opening, to allow delivery of pulse 52. The Q-switch is then closed (line 63) after delivery of the pulse and maintained in the normally-closed condition (line 65). This procedure is repeated until delivery of the remaining pulses in the sequence is complete. The repetition rate PRF of pulses in the sequence is 1/T1.

A preferred embodiment of the inventive method of operating Q-switch 26 to deliver a sequence or train of pulses from laser 20, for example, for performing a machining or ablating operation, is schematically illustrated by timing-diagrams 3A and 3B. Here, initially, Q-switch 26 is being maintained in a "normally-open" condition (see FIG. 3A line 71). Because gain-medium 24 is being continuously pumped at a constant power level, laser 20 will be delivering a constant level of CW laser radiation as indicated by line 73 in FIG. 3B.

When it is desired to deliver a pulse sequence for a particular laser operation, Q-switch 26 is closed (see FIG. 3A, line 75), and held closed for a time period T2 to allow the optical pumping to cause build up of population inversion (energy stored in the excited state) of the gain-medium above the equilibrium excited-state energy of CW operation. Time period T2 is preferably shorter than the time for this population inversion or energy stored in the excited state of the gain-medium to reach a saturation level. The time required to reach a saturation level will depend, inter alia, on the optical pump power, the cross-section of stimulated emission and the excited-state (upper level) lifetime of the gain-medium, but will generally be short compared with the thermal relaxation time of the gain-medium and, accordingly, insufficient to cause a noticeable change in the thermal lensing-condition in the gain-medium. After time T2 has elapsed, Q-switch 26 is returned to the open condition (see FIG. 3A, line 77) and energy stored in the gain-medium is released as a pulse 81 (see FIG. 3B).

Figure 3A:
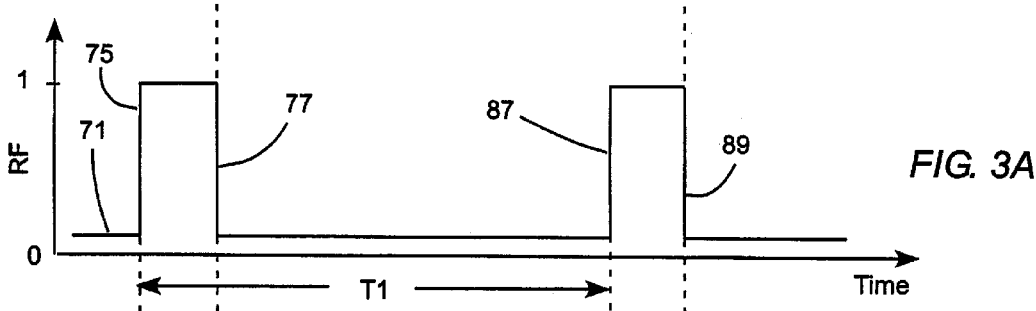
FIGS. 3A and 3B are timing diagrams schematically illustrating a Q-switching method in accordance with the present invention for operating the Q-switch of FIG. 1 to cause the laser to deliver a sequence of pulses.
Figure 3B:
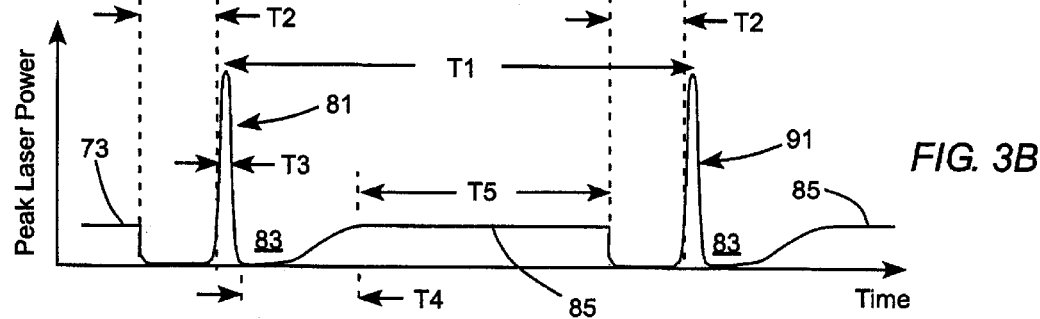

Delivery of pulse 81 temporarily depletes stored energy in the gain-medium and significantly reduces delivery of laser radiation (see FIG. 3B, region 83) before delivery of CW laser radiation at the prior level resumes (see FIG. 3B, line 85). By way of example, the reduced CW operation time T4 is on the order of 2 microseconds depending on the pump power and material of the gain-medium. The interruption period T2, the pulse duration T3, and the reduced CW operation time T4 are all less than the thermal relaxation time of the gain-medium. The thermal relaxation time is in a range from a few milliseconds to tens of milliseconds and depends on factors such as the pump power level, the thermal-conductivity of the gain-medium and cooling arrangements for the gain-medium. During the sequence of these periods T2, T3 and T4 there will be energy-exchange dynamics in the gain-medium tending to both increase and decrease thermal lensing. As a result of this, there will be no significant change in the thermal-lensing condition in the gain-medium.

At a time T2 before the next pulse in the sequence is required, Q-switch 26 is again closed (see FIG. 3A, line 87) and delivery of the CW laser radiation again interrupted for time period T2. The Q-switch is then again reopened (see FIG. 3A, line 89) releasing a pulse 91 at a time T1 after previous pulse 81 was released. Time period T1, of course, is also the time between the (beginnings of) interruption periods T2. Pulse 91 has the same peak power as pulse 81, having been generated by the same energy-exchange dynamics in the gain-medium. After pulse 91, is delivered, the same sequence of Q-switching and pulse-delivery events is repeated until all pulses in the sequence are delivered. At this point, the Q-switch is in its normally-open condition and only CW laser radiation is being delivered. The Q-switch remains in this condition until another sequence of pulses is required.

Thermal lensing in the gain-medium during the delivery of the pulse sequence described with reference to FIGS. 3A and 3B remains essentially constant, and is the same as the thermal lensing in the gain-medium when there is no pulse sequence being delivered. Seen from another aspect, the thermal lensing can be expected to remain constant, as the gain-medium is continuously pumped at a constant power, and before, during, and between deliveries of pulse sequences the average laser radiation energy extracted from the gain-medium remains essentially constant.

Optimum effectiveness of the inventive Q-switching method relies on having a relatively high ratio of a time T5 (see FIG. 3B) for the period between pulses during which steady state CW power is delivered to the interruption period T2. Unfortunately, time T5 is difficult to measure. However, for a constant pump power level, the recovery or depletion time T4 is fixed. Accordingly, a ratio of T1 (the inverse of the PRF) to T2 can also be used to provide a guideline. In general, T2 should be much smaller than T1. This provides that the interruption of CW operation is sufficiently brief that the laser power output is about the same even when T1 is varied. By way of example, if the interruption period T2 is 20 $\mu$s, T1 is preferably about 200 $\mu$s or greater, i.e., the PRF is preferably about 5 KHz or less. A general guideline for providing optimum effectiveness of the inventive Q-switching method is that the ratio T2:T1 is preferably about 3:1 or greater and more preferably about 10:1 or greater, with T2 is preferably being sufficiently shorter than the thermal relaxation time to avoid significant perturbation of the thermal equilibrium in the gain-medium. The upper limit of PRF is restricted by time T4, which is dependent on pumping and resonator configuration for a given gain-medium. If these general guidelines are followed, the method is capable of delivering laser pulses of consistent pulse energy and beam propagation properties laser at any PRF less than about 200 KHz. There is no particular lower limit for the effectiveness of the operation. Indeed, an advantage of the inventive method is that it is equally effective if successive pulses are one-second or more apart.

It should be noted here that while the method of the present invention is described above, for simplicity of description, implicitly in terms of a train of pulses repeated at a regular interval, the method is inherently and equally effective in delivering a train of pulses having an irregular time spacing there between. This is a particularly advantageous aspect of the inventive method. Trains of irregularly spaced pulses are useful in several pulsed laser applications. By way of example, such irregular pulse-trains are often used in certain laser marking operations to provide half-tone graphics.

It should also be noted that in FIG. 3B, the equilibrium (constant) power of CW laser radiation relative to the peak power of pulses 81 and 91 is greatly exaggerated to facilitate illustration. In practice, the peak power of a pulse 81 or 91 may be more than one-hundred times the steady-state CW power. By way of example, in a resonator arrangement wherein pulses 81 and 91 have energy of 300 microjoules ($\mu$J) and a duration (T3) of 20 nanoseconds (ns) and are delivered at pulse repetition rate of 20 KHz, the pulses will have a peak power of about 15 Kilowatts (KW). The corresponding steady-state CW power will usually be less than 10 Watts (W). Accordingly, if a pulse having a peak power of 15 KW is required to effectively ablate a particular material, the 10 W of CW power delivered between pulses will generally be ineffective (insufficient), in itself, to cause ablation of that material. However, in a sufficiently long sequence of pulses, delivered in one position on the material, for example, for laser drilling, the between-pulse CW radiation may contribute to heating the material, and such heating may influence the ablation rate.

If a pulse train generated by the Q-switching method of the present invention is passed through an optically-nonlinear crystal for doubling the laser radiation frequency (halving the wavelength), i.e., for second-harmonic generation (SHG), the relative power of CW radiation compared with pulse power will be reduced by a further two orders of magnitude, i.e., the peak power will be about ten-thousand or more times greater than the CW power. This is because the frequency-conversion efficiency in an optically-nonlinear crystal is proportional to square of the peak power of the laser beam for a given beam width in the crystal. Further frequency conversion to obtain third-harmonic generation (THG) or fourth-harmonic generation (FHG) in a second optically nonlinear crystal will cause yet a further reduction. The between-pulse CW radiation, accordingly, will be essentially ineffective in the machining process, under a majority of practical conditions.

In summary, an inventive method of operating a continuously pumped, Q-switched laser to provide trains (bursts or sequences) of pulses for laser machining operations is described above. The laser includes a solid-state gain-medium that exhibits a thermal-lensing effect on being optically pumped. Pulse delivery is controlled by a Q-switch that is in an open state when the laser is not delivering pulses. This allows the laser to deliver CW laser radiation when pulses are not being delivered. A train of pulses is delivered by repeatedly interrupting the CW operation by closing then reopening the Q-switch. When the Q-switch reopens after the interruption, the laser delivers a pulse of laser radiation then resumes delivery of CW operation until the next interruption. The repeated interruption causes delivery of a train of pulses having sufficient peak power for performing a particular operation, with CW radiation having insufficient power for performing the operation being delivered between pulses. The inventive Q-switching method provides, by means of this one particular repeated Q-switch operation, that the thermal lensing effect in the gain-medium before, during and between delivery of pulse trains remains constant, and that all pulses in a pulse train have the same pulse energy and beam propagation property. Prior-art Q-switching methods for achieving the same result may require two different repeated Q-switching sequences to equate thermal-lensing before during and between delivery of machining-pulse trains, and a separate Q-switch operation to provide that the peak power in the first pulse of a pulse train has the same peak power as all other pulses in the train.

The present invention is described in terms of a preferred embodiment. The invention, however, is not limited to this preferred embodiment. Rather, the invention is limited only by the claims appended hereto.

What is claimed is:

1. A method of operating an optically pumped laser having a solid state gain medium and a Q-switch located within the resonator thereof, said method for generating output pulses of sufficient energy to treat a work piece comprising the steps of:

a) continuously pumping the gain medium at a power sufficient to generate a continuous laser output when the Q-switch is open, said continuous laser output having an energy below the energy necessary to treat the work piece;

b) closing the Q-switch for a first period;

c) thereafter opening the Q-switch for a second period longer than said first period, with the time between the start of the first period and the start of the second period being sufficient to produce an output pulse after the beginning of the second period and having an energy sufficient to treat the work piece, and wherein said continuous laser output is generated during the latter portion of said second period; and d) repeating steps (b) and (c) a plurality of times to produce a plurality of output pulses, with the time between the beginning of each second period and the beginning of each subsequent first period being sufficient to produce said continuous laser output and with the time periods begin controlled to minimize changes in thermal lensing in the resonator.

2. A method as recited in claim 1, wherein during step (d), the duration of the second period is not changed.

3. A method as recited in claim 1, wherein the duration of the second period is varied during subsequent repetitions of step (c).

4. A method as recited in claim 1, wherein ratio of the duration of the second period to the first period is at least 3:1.

5. A method as recited in claim 1, wherein the peak power of the output pulses is at least one hundred times greater than the peak power of the continuous laser output.

6. A method as recited in claim 1, wherein the duration of the first period is varied during subsequent repetitions of step (b).

* * * * *